Dec. 2, 1969   J. L. HARGROVE   3,482,242
SYNCHRO TO DIGITAL CONVERTER USING STORAGE
CAPACITORS AND SAMPLING CIRCUITS
Filed May 25, 1966                     3 Sheets-Sheet 3
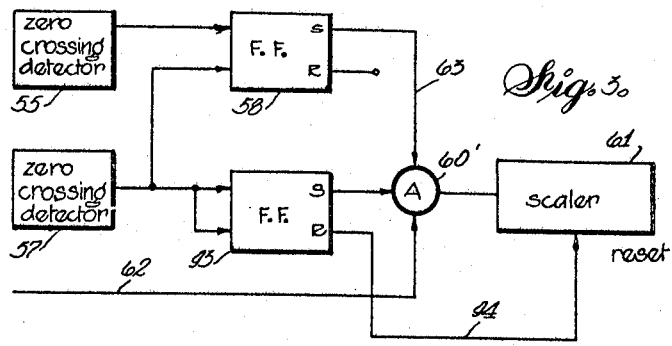
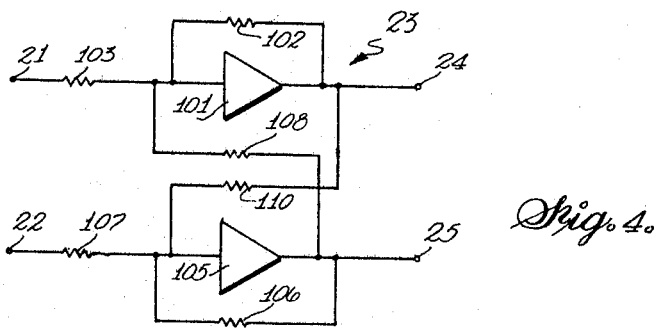
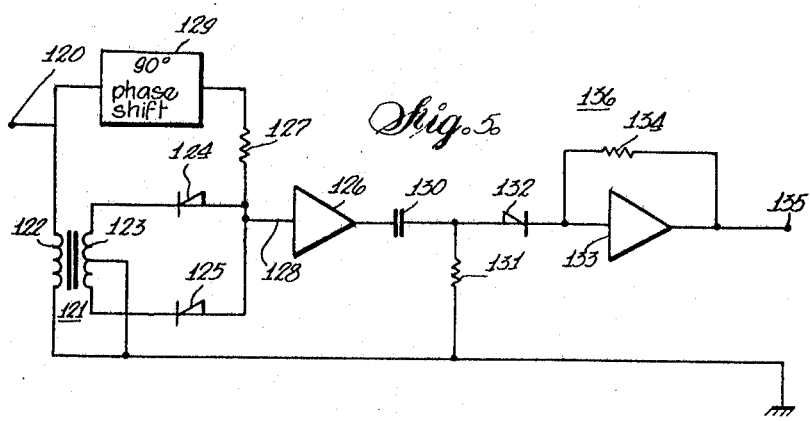
INVENTOR
James L. Hargrove
BY Weir, Marshall,
MacRae, Lamb,
PATENT AGENT United States Patent Office 3,482,242
Patented Dec. 2, 1969

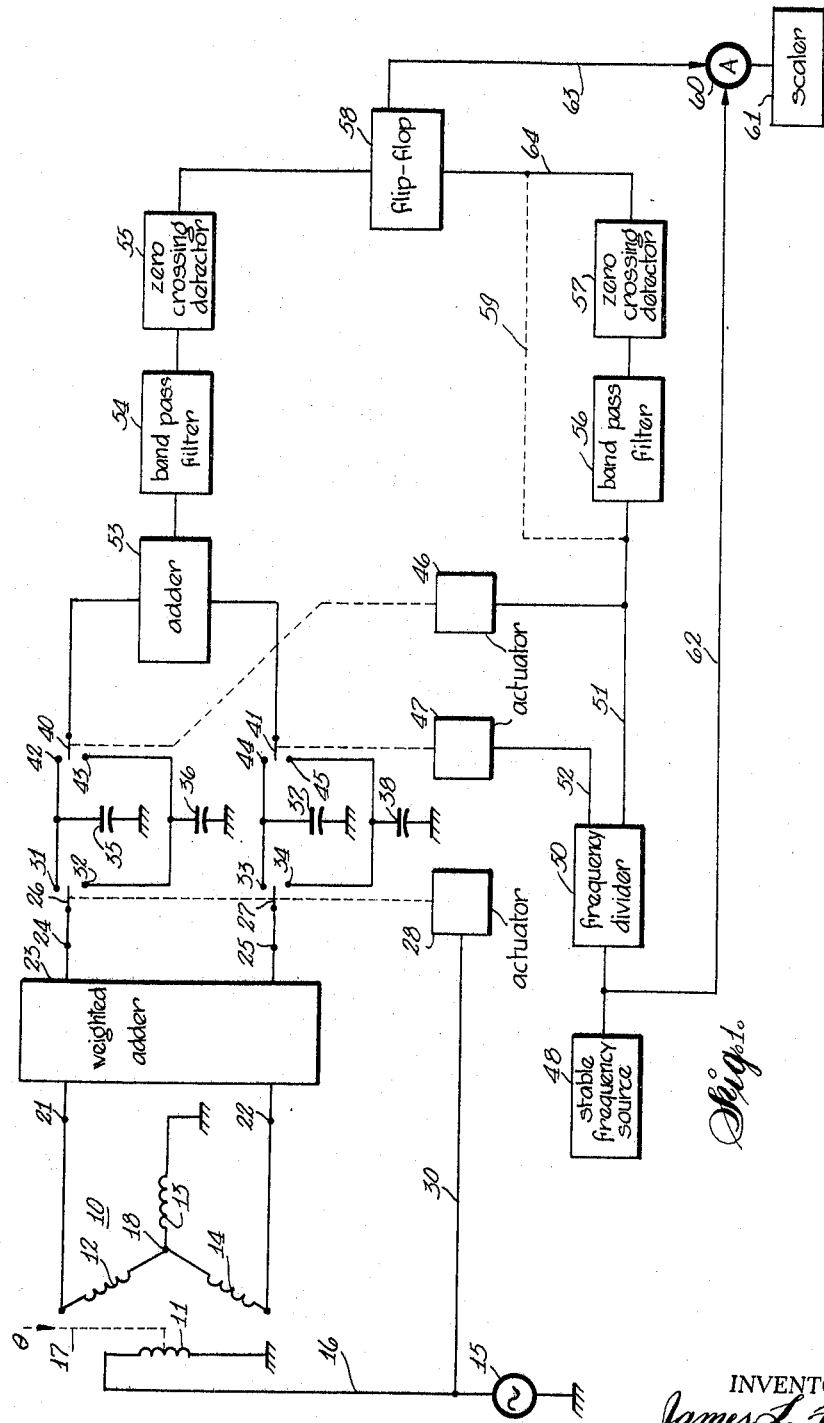

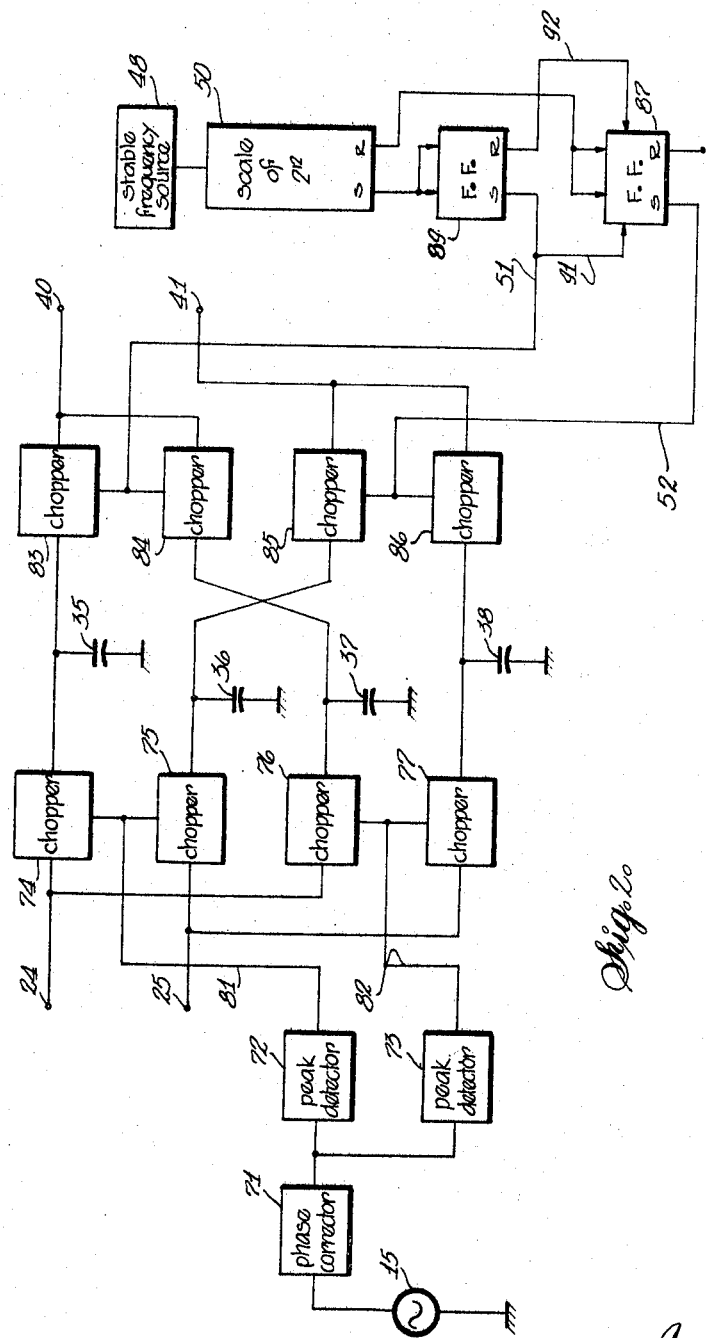

3,482,242
SYNCHRO TO DIGITAL CONVERTER USING
STORAGE CAPACITORS AND SAMPLING
CIRCUITS
James L. Hargrove, Ottawa, Ontario, Canada, assignor
to Computing Devices of Canada Limited, Ottawa,
Ontario, Canada
Filed May 25, 1966, Ser. No. 552,946
Int. Cl. G08b 1/08
U.S. Cl. 340—347                                    10 Claims

ABSTRACT OF THE DISCLOSURE

A system for providing a digital representation of shaft position. Resolver signals are sampled and the peak values stored in capacitor stores. The stored values are resampled at a rate controlled by a stable frequency source to produce two rectangular wave signals in time quadrature. The signals are added and filtered to derive the fundamental component whose phase is measured with respect to the stable frequency source.

This invention relates to a novel system for providing a digital indication of shaft position. In particular, it relates to a novel circuit arrangement for use with such devices as resolvers or synchros to provide a digital indication of the device shaft position.

Rotating devices furnishing angular information are widely used in computer circuitry. Typical of such devices are synchros and resolvers having, in their simplest form, a primary winding magnetically coupled to several secondary windings. The primary and secondary windings are capable of relative rotation and, when the primary winding is excited from a constant frequency source, the voltages appearing across the secondary windings provide a measure of the shaft angle of the device. These voltages alternate at the frequency of the primary excitation source and have a peak amplitude related to the device shaft angle.

In a synchro the secondary windings are generally three in number, uniformly spaced around the primary and connected in Y configuration. The peak amplitudes of the alternating voltages appearing across the three windings are proportional to $\sin \theta$, $\sin (\theta+120)$ and $\sin (\theta-120)$ where $\theta$ is the synchro shaft angle with respect to an arbitrary reference. In the simplest form of resolver there are two secondary windings arranged in space quadrature. The peak amplitudes of the alternating voltages appearing across the windings are proportional to $\sin \theta$ and $\cos \theta$, with $\theta$ defined as before. It is known to convert the signals from synchro windings to the form corresponding to the signals obtained from resolver windings, that is having amplitudes proportional to $\sin \theta$ and $\cos \theta$; a novel circuit for accomplishing this result is disclosed in this application.

Known systems for deriving a digital indication of shaft position from such resolver signals function by phase shifting the signals so that their alternating components are in time quadrature. The signals are then added and the result is a constant amplitude signal having a phase displacement, relative to the primary excitation source, representing the shaft position. This phase displacement is measured by a phase meter having a digital output to provide the required digital indication of shaft angle. Various sources of error limit the accuracy of such systems. For example, any drift in the frequency of the primary excitation source may affect the response of the phase shifting network. In addition the phase relationships between the primary and secondary windings of the resolver or synchro may be temperature dependent and rotation dependent.

It is an object of this invention to provide a novel system for obtaining a digital indication of shaft position having improved accuracy.

The system of this invention utilizes input signals at a common frequency whose peak amplitudes are representative of the sine and cosine function of the shaft rotation of interest. Such signals are, of course, available from resolver output windings, alternatively, the system of this invention contemplates the use of novel weighted adding means to obtain such signals from the signals available from a three winding synchro.

Briefly, in the system of this invention, the signals whose peak values of amplitude represent the sine and cosine information are sampled at the frequency of the primary excitation voltage and the peak values extracted. These sampled values are stored in suitable storage means, such as capacitors. These stored values are then resampled under the control of a pair of reference signals. The reference signals are derived from a stable clock pulse source and are accurately in time quadrature with one another. From the resampling operation there are derived two signals of rectangular waveform in time quadrature, one having an amplitude proportional to the cosine and the other having an amplitude proportional to the sine of the shaft angle. These signals are then added and the composite signal fed to a band-pass filter to remove all harmonics and cross modulation components and leave only the fundamental component. The phase of this fundamental component is then measured with respect to one of the pair of reference signals and the measured value represents the angle of shaft rotation. Desirably, the phase measurement uses the stable clock source, from which the reference signals are derived, as the timing reference. Since most of the signal processing is performed on signals derived from the stable clock pulse source any shift in the phase or frequency of the signals obtained from the resolver or synchro does not affect this portion of the system.

Other objects and advantages of this invention will become aparent from the following description of a preferred embodiment of this invention, taken in conjunction with the accompanying drawings, in which:

FIGURE 1 is a functional diagram of one embodiment of the system of this invention, FIGURE 2 is a functional diagram in greater detail of the sampling networks of the system of FIGURE 1, FIGURE 3 is a block diagram showing the phase measuring circuit of the system of FIGURE 1 in greater detail, FIGURE 4 is a schematic diagram of a weighted adder useful in the system of this invention, and FIGURE 5 is a schematic diagram of a zero crossing detector useful in the system of this invention.

Referring now to FIGURE 1, there is shown a synchro, indicated generally at 10, having a primary winding 11 and secondary windings 12, 13 and 14. The primary winding is connected to a source of primary excitation voltage 15 by a conductor 16. Primary winding 11 is rotatable with respect to the secondary windings as indicated diagrammatically by shaft 17. The angle of shaft 17 with respect to an arbitrary reference is denoted by $\theta$. The secondary windings are connected to a star point 18 and the remaining end of winding 13 is grounded. The remaining ends of windings 12 and 14 are connected to input terminals 21 and 22, respectively, of a weighted adder 23 having output terminals 24 and 25.

The structure of weighted adder 23 will be described in detail hereinafter but, generally, its function is to transform the signals appearing at terminals 21 and 22 from the form:

$$\sin(\theta+30)\sin w_1 t$$

and $$\sin(\theta-30)\sin w_1 t$$

to the form:

$$\sin(\theta+45)\sin w_1 t$$

and $$\sin(\theta-45)\sin w_1 t$$

In these expressions $\theta$ is the phase angle of the synchro rotor, as defined above and $w_1$ is the frequency of the primary excitation source 15. If, for convenience in notation $(\theta-45)$ is denoted by $\phi$ then the signals at terminals 24 and 25 may be expressed in the form:

$$\sin\phi \sin w_1 t$$

and $$\cos\phi \sin w_1 t$$

Returning to the system of FIGURE 1 the peak values of the signals appearing at terminals 24 and 25 are sampled by means of a sampling network schematically indicated by switches 26 and 27. Switches 26 and 27 have output terminal pairs 31, 32 and 33, 34, respectively, and are controlled by an actuating unit 28. Actuating unit 28 is in turn controlled by the primary excitation source 15 via a conductor 30 so that switches 26 and 27 contact terminals 31 and 33 respectively at the positive peak of the primary excitation voltage and contact terminals 32 and 34 respectively at the negative peaks of the primary excitation voltage.

Storage capacitors 35 through 38 are provided each having one plate grounded. The non-grounded plates of each of capacitors 35 through 38 are connected to terminals 31 through 34 respectively so that the sampling network stores on the capacitors the positive and negative peak values of the signals appearing at terminals 24 and 25. That is: capacitor 35 retains a voltage proportional to $\sin\phi$; capacitor 36 retains a voltage proportional to $-\sin\phi$; capacitor 37 retains a voltage proportional to $\cos\phi$ and capacitor 38 retains a voltage proportional to $-\cos\phi$.

A further sampling network is provided, schematically indicated by switches 40 and 41. Switches 40 and 41 have input terminal pairs 42, 43 and 44, 45, respectively, and are controlled by actuating units 46 and 47 respectively. The non-grounded plates of capacitors 35 through 38 are connected to terminals 42 through 45 respectively.

The control signals for actuating units 46 and 47 are derived from a stable frequency source 48 feeding a frequency divider 50. A more detailed description of frequency source 48 and frequency divider 50 is given hereinafter in connection with FIGURE 2. It is sufficient for the present explanation to note that the control signals from frequency divider 50 appear on two conductors 51 and 52 and have a rectangular waveform the fundamental components of each being accurately in phase quadrature. Conductor 51 is connected to actuating unit 46 and conductor 52 is connected to actuating unit 47. The sampling network functions to produce at switch 40 a rectangular waveform whose positive and negative excursions differ by $\sin\phi$ and to produce at switch 41 a rectangular waveform whose positive and negative excursions differ by $\cos\phi$. These signals appearing at switches 40 and 41 are fed to an adder 53 and from the adder to a band-pass filter 54.

If the fundamental frequency of the control signals appearing on conductors 51 and 52 is denoted by $w_2$ then the composite signal appearing at the output of bandpass filter is of the form:

$$\sin\phi \cos w_2 t + \cos\phi \sin w_2 t = \sin(w_2 t + \phi)$$

That is, a constant amplitude sinusoid whose phase angle with respect to the control frequency represents the desired information as to synchro shaft position.

The remaining circuitry of FIGURE 1 provides an accurate digital measurement of the phase angle $\phi$. The signal from band-pass filter 54 is connected to the input of a zero crossing detector 55. Zero crossing detector 55 emits an output pulse whenever its input signal voltage passes through zero from negative to positive. That is, although a sinusoidal signal passes through zero twice per cycle, detector 55 emits only one pulse per cycle. A suitable form of zero crossing detector will be described below in connection with FIGURE 5.

A flip-flop 58 is provided having its SET input connected to the output of zero crossing detector 55. A two input AND gate is provided having one input connected to the SET output of flip-flop 58 via a conductor 63. A scaler 61 is connected to the output of AND gate 60.

A further band-pass filter 56 is provided having its input connected to the control signal appearing on conductor 51. It will be remembered that this control signal is of rectangular waveform. Filter 56 is connected to a further zero crossing detector 57 which, in turn, is connected to the RESET input of flip-flop 58 via conductor 64.

That portion of the system of FIGURE 1 described in the three immediately preceding paragraphs digitally measures the phase of the composite signal appearing at the output of filter 54 with respect to the reference signal appearing at the output of filter 56. When the composite signal passes through zero in a positive direction detector 55 emits a pulse which switches flip-flop 58 to the SET condition. This opens AND gate 60 and permits the signal from the stable frequency source 48 to pass to scaler 61. When the reference signal, appearing at the output of filter 56 passes through zero in a positive direction detector 57 emits a pulse which switches flip-flop 58 to the RESET condition and thus shuts AND gate 60. The scaler stops counting and the accumulated count is a measure of the desired phase information $\phi$.

Filter 56 and detector 57 are identical to filter 54 and detector 55, respectively. This serves to compensate for any variation with temperature in the characteristics of these elements, specifically the filters. If filter 54 has a substantially zero temperature coefficient it is possible to dispense with filter 56 and detector 57 and substitute a direct connection from conductor 51 to conductor 64 as shown by the dotted line 59 in FIGURE 1.

Referring now to FIGURE 2 there is shown in greater detail an embodiment of the sampling circuits useful in the system of FIGURE 1. Those parts of the sampling circuits already described in connection with FIGURE 1 bear the same reference numerals. As previously described, the peak values of the input signals appearing at terminals 24 and 25 are sampled and stored on capacitors 35 through 38. These stored values are then resampled under the control of a stable frequency source and the resampled signals appear at terminals 40 and 41. Terminal 24 is connected to capacitors 35 through 37 via choppers 74 and 76 respectively. Terminal 25 is connected to capacitors 36 and 38 via choppers 75 and 77 respectively. Capacitors 35 and 37 are connected to terminal 40 via choppers 83 and 84 respectively. Capacitors 36 and 38 are connected to terminal 41 via choppers 85 and 86 respectively.

Choppers 74 through 77 are controlled by the primary excitation source 15 which is connected through a phase corrector 71 to a positive peak detector 72 and a negative peak detector 73. Phase corrector 71 is adjusted to compensate for any fixed phase shift occurring in the synchro and weighted adder. Peak detectors 72 and 73 provide at their outputs an actuating pulse in synchronism with the positive and negative peaks, respectively, of the waveform at the output of phase corrector 71. These actuating pulses are supplied via conductors 81 and 82 to chopper pairs 74, 75 and 76, 77, respectively.

Choppers 83 through 86 are controlled, indirectly, from stable frequency source 48 which may, typically, be an 8 mc./s. crystal controlled oscillator. Frequency source 48 feeds a frequency divider 50 which may be a scaling circuit composed of a plurality of flip-flops connected in series, each flip-flop counting at half the rate of the preceding flip-flop. A typical scaling circuit in the embodiment of FIGURE 2 employs twelve flip-flops to give a scaling factor of $2^{12}$ or 4096. Two further flip-flops 89 and 87 are provided to give rectangular waveform output signals on conductors 51 and 52 having fundamental components accurately in phase quadrature at a total scaling factor of 8192.

The input to flip-flop 89 is supplied from the SET output of the last flip-flop in scaling circuit 50 and the input to flip-flop 87 is supplied from the RESET output of the last flip-flop in scaling circuit 50. The SET outputs of flip-flops 89 and 87 thus provide signals of rectangular waveform which are in phase quadrature. To remove the possible ambiguity as to the phase of the signal from flip-flop 89, on conductor 51, with respect to the corresponding signal from flip-flop 87, on conductor 52, the input to flip-flop 87 is passed through conventional steering gates actuated by the SET and RESET outputs of flip-flop 89 via conductors 91 and 92. This ensures that the signal on conductor 51 either leads or lags the signal on conductor 52 by 90° but cannot change from one to the other.

The operation of the sampling circuit shown in FIGURE 2 will now be reviewed. Choppers 74 and 75 are actuated at the instant of positive peak value of the input waveforms to store signals representing sin $\phi$ and cos $\phi$ on capacitors 35 and 36 respectively. Similarly, choppers 76 and 77 are actuated at the instant of negative peak value of the input waveforms to store signals representing —sin $\phi$ and —cos $\phi$ on capacitors 37 and 38. Choppers 83 and 84 are operated alternately at the reference frequency, approximately 1 kc./s. for the frequency source and scaling circuit described, to produce at terminal 40 a rectangular waveform having positive and negative excursions of amplitude sin $\phi$. Similarly, choppers 85 and 86 are operated alternately at the reference frequency to produce at terminal 41 a rectangular waveform having positive and negative excursions of amplitude cos $\phi$. The signal appearing at terminal 40 is accurately in quadrature with the signal appearing at terminal 41.

A preferred arrangement for the digital phase measuring portion of the system of FIGURE 1 is shown in FIGURE 3. Referring now to FIGURE 3 it will be seen that the system portion there disclosed differs from that shown in FIGURE 1 by the provision of a complementing flip-flop 93. AND gate 60 has been modified to a three input AND gate 60' and a RESET input has been shown for scaler 61. Flip-flop 93 is connected to the output of zero crossing detector 57 and has its set output connected as the third input to AND gate 60'. The RESET output of flip-flop 93 is connected to the RESET input of scaler 61 via conductor 94.

In the operation of the portion of the system shown in FIGURE 3 scaler 61 operates only on every second cycle of the reference signal supplied to zero crossing detector 57 and is reset on alternate cycles of the reference signal. This action is achieved because the SET output of flip-flop 93 is enabled on every second cycle of the reference signal and, hence, AND gate 60' is open only on every second cycle of the reference signal. Clearly scaler 61 may be connected to any output register or display panel in a manner well known to those skilled in the art.

Referring now to FIGURE 4 there is shown a preferred embodiment of weighted adder 23. It will be remembered that this adder transforms signals of the form $$\sin (\theta+30) \sin w_1 t$$

and $$\sin (\theta-30) \sin w_1 t$$

appearing at terminals 21 and 22, to signals of the form $$\sin (\theta+45) \sin w_1 t$$

and $$\sin (\theta-45) \sin w_1 t$$

appearing at terminals 24 and 25.

Weighted adder 23 includes a first inverting amplifier 101 connected in operational amplifier configuration by means of a feedback resistor 102. A resistor 103 connects terminal 21 to the input of amplifier 101 and the output of amplifier 101 is connected directly to terminal 24. A second inverting amplifier 105 is provided connected in operational amplifier configuration by a feedback resistor 106. A resistor 107 connects terminal 22 to the input of amplifier 105 and the output of amplifier 105 is connected to terminal 25. The output of amplifier 105 is coupled to the input of amplifier 101 by a resistor 108 and the output of amplifier 101 is coupled to the input of amplifier 105 by a resistor 110.

Resistors 102 and 106 are chosen to have the same resistance value, denoted by $R_F$. The values of resistors 108 and 110 are also equal and related to $R_F$, being of value $R_F$/tan 15. Input resistors 103 and 107 are equal and of value $R_1$. Amplifier 101 functions as a summing amplifier to add, algebraically, the voltages appearing at terminal 21 and at the output of amplifier 105. With the specified values of resistance the peak amplitude of the alternating signal appearing at terminal 24 is proportional to:

$$\sin (\theta+30) - \tan 15 \sin (\theta-30)$$

which may be shown to be equivalent to sin $(\theta+45)$ multiplied by a constant. The output signal level may be varied by adjusting the value of $R_1$.

In a similar fashion the peak amplitude of the alternating signal appearing at terminal 25 is proportional to:

$$\sin (\theta-30) - \tan 15 \sin (\theta+30)$$

which is equivalent to sin $(\theta-45)$ multiplied by a constant.

Thus there has been described a weighted adder for accepting alternating signals having peak amplitudes proportional to sin $(\theta+30)$ and sin $(\theta-30)$ and producing signals having peak amplitudes proportional to sin $(\theta+45)$ and sin $(\theta-45)$. It will be clear to one skilled in the art that such an adder is not restricted to a change of 15° in the argument of the amplitude function and is, in fact, adapted to change the argument of the amplitude function by almost any desired amount. This is achieved by adding a different amount of the first signal to the second signal and vice-versa. For the general case the ratio of the signals added is more complex than for the specific example set out above and may be expressed as:

$$\sin (\theta-30) + K \sin (\theta+30) = K_1 \sin (\theta-\phi)$$

where $$\tan \phi = \frac{1-K}{\sqrt{3}(1+K)}$$

and $K_1$ is a constant.

A form of zero crossing detector suitable for use in the system of this invention is shown in FIGURE 5. An input terminal 120 is provided for connection to a sinusoidal signal whose zero crossing is to be detected. A transformer 121 has a primary winding 122 and a secondary winding 123. One end of primary winding 122 is connected to terminal 120, the other end is grounded. Secondary winding 123 has its center-tap grounded and is connected in a full-wave rectifier circuit consisting of two diodes 124 and 125 having a return resistor 127. In a conventional configuration resistor 127 would be connected to ground, however, in this circuit it is connected only indirectly to ground via a 90° phase shifting circuit 129 and primary winding 122. The junction point of diodes 124 and 125, which forms the output of the circuit, is connected to a non-inverting isolation amplifier 126 by a conductor 128.

The circuit formed by diodes 124 and 125 functions to produce the well known waveform of a full-wave rectified sine wave with the cusps extending positively. The phase of the signal applied to resistor 127 via phase shifter 129 is such that every second cusp of the full wave rectified waveform is suppressed and the waveform occurring at the output of amplifier 126 has a single peak, corresponding to the remaining cusp, occurring once per cycle at the instant of zero crossing of the input waveform in the positive direction. Clearly the instant of zero crossing in the negative direction could be selected by changing phase shift circuit 129 from a lead to a lag circuit. It is not necessary that the phase shift provided by circuit 129 be exactly 90°, a phase shift in the region of 90° will be sufficient to suppress every second cusp of the waveform.

In order to provide a pulse at the exact moment of zero crossing a peak detector, indicated generally at 136, is employed. Peak detector 136 includes a long time constant network consisting of a capacitor 130 and a resistor 131. Capacitor 130 has one plate connected to the output of isolation amplifier 126 and the other plate connected to ground via resistor 131. The junction of capacitor 130 and resistor 131 is connected to the input of an inverting amplifier 133 via a diode 132. Amplifier 133 is connected as an operational amplifier by means of a feedback resistor 134 connected between the amplifier output terminal 135 and its input. Diode 132 is poled so as to conduct towards the amplifier input terminal.

The operation of peak detector 136 is such that resistor 130, capacitor 131 and diode 132 function as a D.C. restorer circuit with only the peaks of the input signal biasing diode 132 into conduction. The input impedance of amplifier 133 when connected as an operational amplifier is, of course, low. Hence a pulse of current of very short time duration flows into the operational amplifier during the peak of the input signal. By suitable choice of the values of resistors 131 and 134 the resulting output pulse from amplifier 133 may be made as narrow as desired, compatible with the capabilities of the amplifier.

It will be clear to one skilled in the art that further stages of peak detection may be used to produce a still narrower pulse at the instant of zero crossing of the sinusoidal waveform. A pulse squaring circuit may also be used to sharpen the edges of the resulting pulse for use as a trigger pulse in the subequent circuits.

Thus there has been described a novel system for providing a digital indication of shaft position. In addition there has been described a particular form of weighted adder and zero crossing detector suitable for use with such a system.

I claim:

1. In an apparatus for measuring shaft position, input means for receiving first and second alternating signals at a predetermined frequency having peak amplitudes proportional, respectively, to the sine and cosine of the angular position of a shaft with respect to an arbitrary reference position,
   first sampling means repetitively operated at said predetermined frequency connected to said input means for sampling the maximum excursions of said first and second signals,
   storage means coupled to said first sampling means for retaining the sampled maximum excursions,
   a source of first and second reference signals at a common frequency in phase quadrature with one another,
   second sampling means responsive to said reference signal source to produce first and second sampled pulse trains related in frequency and phase to said first and second reference signals, respectively, and having an amplitude proportional to said stored maximum values,
   adding means connected to said second sampling means and responsive to said first and second sampled pulse trains to produce a composite signal,
   phase comparing means coupled to said adding means and said reference signal source for determining the phase of the fundamental component of said composite signal with respect to said first reference signal.

2. Apparatus as defined in claim 1 wherein said phase comparing means includes a band-pass filter to transmit only the fundamental component of said composite signal and timing means started at the instant of zero crossing of said fundamental component and stopped at the instant of zero crossing of said first reference signal.

3. Apparatus as defined in claim 2 wherein said timing means includes a first zero crossing detector responsive to said fundamental component to emit a control pulse once per cycle at a point of zero crossing, a bistable circuit responsive to said control pulse to assume a first stable state and responsive to the zero crossing of said first reference signal to assume a second stable state, a constant frequency source, a scaler coupled to said constant frequency source and controlled by said bistable circuit to count when said bistable circuit is in said first stable state.

4. Apparatus as defined in claim 3 wherein said zero crossing detector comprises a full wave rectifier circuit producing a pulse at each zero crossing, phase shifting means connected to said full wave rectifier circuit for eliminating every second pulse and peak amplifying means connected to the output of said full wave rectifier circuit for selecting a narrow portion of the remaining pulses.

5. Apparatus as defined in claim 4 wherein said peak amplifying means has a pair of input terminals and a pair of output terminals one of said input terminals being connected to one of said output terminals, a low input impedance amplifier, the other of said input terminals being connected to the input of said amplifier by a series connection of a capacitor and a diode in that order, a resistor connecting the junction point of said capacitor and diode to said second input terminal, the output terminal of said amplifier forming the other output terminal of said peak amplifying means.

6. Apparatus as defined in claim 3 wherein said first and second reference signals are derived from said constant frequency source by a frequency dividing circuit.

7. Apparatus as defined in claim 1 further comprising signal producing means responsive to said shaft position to produce said first and second signals.

8. Apparatus as defined in claim 7 wherein said signal producing means is a resolver.

9. Apparatus as defined in claim 7 wherein said signal producing means comprises a synchro having windings coupled to weighted adding means to produce said first and second signals, said first and second signals representing weighted sums of the signals appearing across said synchro windings.

10. Apparatus as defined in claim 9 wherein said weighted signal adding means receives synchro signals A and B having peak amplitudes proportional to sin $(\theta+30)$ and sin $(\theta-30)$, respectively, when $\theta$ denotes the synchro shaft angle, and comprises first adding means to form the sum $A-\tan 15° B$ and second adding means to form the sum $B-\tan 15° A$.

References Cited

UNITED STATES PATENTS 3,277,461  10/1966  Selvin _____ 340—347
3,399,352  8/1968  Dalton _____ 328—151 X MAYNARD R. WILBUR, Primary Examiner M. K. WOLENSKY, Assistant Examiner U.S. Cl. X.R.

320—1